US012754089B2

(12) United States Patent
Forster et al.

(10) Patent No.: US 12,754,089 B2
(45) Date of Patent: Oct. 6, 2026

(54) TORQUE DETERMINING SYSTEM FOR DRIVELINE COMPONENTS IN WORK VEHICLES

(71) Applicant: Deere & Company, Moline, IL (US)

(72) Inventors: Jonathan D. Forster, Wann, OK (US); Stacy K. Worley, Coffeyville, KS (US); Michael O. DeSilva-Ranasinghe, Coffeyville, KS (US)

(73) Assignee: DEERE & COMPANY, Moline, IL (US)

( * ) Notice: Subject to any disclaimer, the term of this patent is extended or adjusted under 35 U.S.C. 154(b) by 279 days.

(21) Appl. No.: 18/748,582

(22) Filed: Jun. 20, 2024

(65) Prior Publication Data

US 2025/0389599 A1 Dec. 25, 2025

(51) Int. Cl.
*G01L 5/12* (2006.01)

(52) U.S. Cl.
CPC .................................... *G01L 5/12* (2013.01)

(58) Field of Classification Search
CPC ........................................................ G01L 5/12
See application file for complete search history.

(56) References Cited

U.S. PATENT DOCUMENTS 3,305,818 A 2/1967 Brueggeman et al.
3,903,738 A 9/1975 Malchow
4,002,139 A 1/1977 Payne
4,089,216 A * 5/1978 Elias .................... G01L 1/2231 73/862.31
4,474,060 A 10/1984 Crossman
4,530,245 A 7/1985 Jacobson (Continued)

FOREIGN PATENT DOCUMENTS

CN 104276251 A 1/2015
DE 102010027010 A1 1/2012

(Continued)

OTHER PUBLICATIONS

Eric Hicks, Torque Sensors on Electric Bikes, retrieved from Internet (https://www.electricbike.com/Torque-Sensors#Comments), dated Oct. 18, 2012, 11 pages.

(Continued)

*Primary Examiner* — David J Bolduc
(74) *Attorney, Agent, or Firm* — KLINTWORTH & ROZENBLAT LLP

(57) ABSTRACT

A torque determining system for a driveline of a work vehicle includes a driveline component with a housing, an intermeshing torque transmission component within the housing, and a shaft supporting the transmission component for rotation about a shaft axis. The shaft, coupled to the housing for relative rotation, is configured to transfer an axial thrust load along the shaft axis from the transmission component to the housing. The system includes a strain sensor mounted on the housing to sense localized strain arising from the axial thrust load and output a corresponding strain value. A control unit, equipped with processing and memory architecture, executes logic to receive the strain value, derive a torque value associated with the transmission component based on the strain value, and output the derived torque value for utilization on the work vehicle.

20 Claims, 5 Drawing Sheets

(56) References Cited

U.S. PATENT DOCUMENTS

| | | | | |
|---|---|---|---|---|
| 4,608,861 | A | 9/1986 | Wachtler et al. | |
| 4,625,554 | A | 12/1986 | Lanzoni | |
| 4,821,563 | A | 4/1989 | Maron | |
| 5,313,828 | A * | 5/1994 | Kotzle | G01L 5/1627 73/146 |
| 6,289,749 | B1 * | 9/2001 | Sanders | F16K 37/0083 73/862.49 |
| 7,240,570 | B2 | 7/2007 | Mcdearmon | |
| 7,706,935 | B2 | 4/2010 | Dube et al. | |
| 8,113,066 | B2 | 2/2012 | Eckstein et al. | |
| 8,683,876 | B2 | 4/2014 | Fujii et al. | |
| 9,052,011 | B2 | 6/2015 | Morselli et al. | |
| 9,651,140 | B2 * | 5/2017 | Åsbogård | F16H 61/688 |
| 10,309,847 | B2 | 6/2019 | Cheng et al. | |
| 10,557,767 | B2 * | 2/2020 | Fulleringer | G01L 3/1428 |
| 11,099,088 | B2 | 8/2021 | Whiteman et al. | |
| 11,614,373 | B2 | 3/2023 | Whiteman et al. | |
| 2003/0233888 | A1 * | 12/2003 | Gierling | G01L 3/1442 73/862.31 |
| 2006/0117863 | A1 | 6/2006 | Kim | |
| 2009/0021363 | A1 | 1/2009 | Heise | |
| 2009/0208279 | A1 | 8/2009 | Cermak | |
| 2014/0026680 | A1 * | 1/2014 | Hyte | G01L 3/1471 73/862.191 |
| 2020/0103315 | A1 * | 4/2020 | Gravina | G01M 15/14 |
| 2020/0200626 | A1 * | 6/2020 | Whiteman | G01L 5/0004 |
| 2021/0116316 | A1 * | 4/2021 | Schricker | G01L 5/167 |
| 2022/0332187 | A1 * | 10/2022 | Whiteman | F16H 48/08 |
| 2025/0075785 | A1 * | 3/2025 | Kobayashi | F16H 49/001 |

FOREIGN PATENT DOCUMENTS

| | | | |
|---|---|---|---|
| DE | 102012200232 | A1 | 7/2013 |
| DE | 102015201577 | A1 | 8/2016 |
| DE | 102015201607 | A1 | 8/2016 |
| DE | 202018107337 | U1 | 1/2019 |
| DE | 102017120796 | A1 | 3/2019 |
| DE | 102019216027 | A1 | 6/2020 |
| EP | 0344496 | B1 | 8/1993 |
| EP | 2615022 | A1 | 7/2013 |
| JP | 2012189495 | A | 10/2012 |
| WO | WO2003082527 | A1 | 10/2003 |
| WO | WO2013104981 | A1 | 7/2013 |
| WO | WO2016120093 | A2 | 8/2016 |
| WO | WO2016120095 | A1 | 8/2016 |

OTHER PUBLICATIONS

German Search Report issued in counterpart application No. 10219216027.1 dated Jul. 13, 2020 (05 pages).

Torque Sensor and Geared Drive, retrieved from Internet (https://ibikes.wordpress.com/2015/06/07/torque-sensor-geared-drive/), dated Jul. 6, 2015, 7 pages.

Non-Final Office Action issued in connection with U.S. Appl. No. 17/303,244 dated Sep. 16, 2022, 28 pages.

Non-Final Office Action issued in connection with U.S. Appl. No. 16/228,875 dated Aug. 6, 2020, 39 pages.

Final Rejection issued in connection with U.S. Appl. No. 16/228,875 dated Feb. 24, 2021, 56 pages.

Model 178—Extensometer—Revere—Force Sensors Blog Video, https://blog.vpgforcesensors.com/model-178-extensometer-revere/, May 23, 2022. (3 pages).

OEM Off-Highway, VPG Transducers Model 182 Extensometer, Vishay Precision Group Inc., https://www.oemoffhighway.com/electronics/sensors/product/20865602/vishay-precision-group-inc-vpg-transducers-model-182-extensometer, Jun. 22, 2017. (10 pages).

* cited by examiner

TORQUE DETERMINING SYSTEM FOR DRIVELINE COMPONENTS IN WORK VEHICLES

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to work vehicles, and specifically, to systems that determine torque values in driveline components.

BACKGROUND OF THE DISCLOSURE

The shift towards advanced driveline technologies in work vehicles has highlighted the need for accurate and reliable torque measurement systems. Traditional methods of measuring torque involve the use of direct torque sensors, which are often costly. These sensors can cost tens of thousands of dollars and may involve installation processes that can disrupt existing system designs.

Implementing direct torque sensors presents several drawbacks. They typically require significant changes to the transmission housing to accommodate the sensor, which can lead to increased manufacturing complexity and cost. Moreover, these sensors are often susceptible to damage from external loads and environmental conditions, which can compromise their accuracy and reliability.

Additionally, traditional torque sensors are often affected by external variables such as vibrations, temperature fluctuations, and mechanical shocks, which can introduce errors in torque measurement. These factors necessitate frequent recalibration and maintenance, further increasing the operational costs and downtime for work vehicles.

Environmental factors such as temperature variations can significantly impact the performance of traditional torque sensors. Temperature changes can cause drift in sensor readings, leading to inaccurate torque measurements. Therefore, ensuring the accuracy of these sensors under varying operating conditions remains a substantial challenge.

Overall, while traditional direct torque sensors provide a means to measure torque, their high cost, complexity of integration, susceptibility to external influences, and maintenance requirements highlight the need for more efficient and reliable solutions in the field of driveline technology for work vehicles.

SUMMARY OF THE DISCLOSURE

Torque determining systems for driveline components for work vehicles are disclosed. One embodiment disclosed is directed to a torque determining system for a driveline of a work vehicle a driveline component having: a housing; an intermeshing torque transmission component contained within the housing; and a shaft supporting the intermeshing torque transmission component for rotation about a shaft axis, the shaft being coupled to the housing for relative rotation and configured to transfer an axial thrust load extending in a direction of the shaft axis from the intermeshing torque transmission component to the housing; a strain sensor mounted to the housing and configured to: sense a localized strain arising in the housing from the axial thrust load; and output a strain value that is indicative of the localized strain; and a control unit having processing and memory architecture configured to execute logic to: receive the strain value from the strain sensor; derive a torque value associated with the intermeshing torque transmission component based on the received strain value; and output the derived torque value for utilization on the work vehicle. Other embodiments of this aspect include corresponding computer systems, apparatus, and computer programs recorded on one or more computer storage devices, each configured to perform the actions of the methods.

Implementations may include one or more of the following features. The system where the driveline component includes additional intermeshing torque transmission components and additional shafts that each transfer additional axial thrust loads to the housing along additional shaft axes, where the localized strain is caused by the axial thrust load and the additional axial thrust loads. The axial thrust load and the additional axial thrust loads, each produce a strain force component and the localized strain is a summation of strain force components. The additional shafts and additional intermeshing torque transmission components intersect the housing at a distinct location along the housing. The strain sensor is located at a position on the housing that corresponds to a point of maximum strain measured which was predetermined for the driveline component and housing. The intermeshing torque transmission component may include a gear set, and the gear set includes at least one helical gear configured to generate the axial thrust load when torque is applied. The control unit is further configured to compare the derived torque value with a predetermined torque threshold and generate an alert when the derived torque value exceeds the predetermined torque threshold. The strain sensor is a piezoelectric type sensor designed to output electrical signals proportional to the strain experienced at a mounting location of the strain sensor. The control unit is configured to: adjust the derived torque value based on a calibration curve related to temperature variations measured by a temperature sensor; and output the adjusted torque value for adjusting a work vehicle operating parameter. The control unit utilizes the derived torque value to modify a gear shift strategy for the work vehicle. The control unit utilizes the derived torque value to implement a power management protocol for the work vehicle. The control unit utilizes the derived torque value to predict a life of a work vehicle component or schedule maintenance or replacement of the work vehicle component based on predicted wear and tear inferred from the derived torque. Implementations of the described techniques may include hardware, a method or process, or computer software on a computer-accessible medium.

One general aspect includes a method for determining torque in a work vehicle. The method also includes sensing, via a strain sensor, a localized strain arising from an axial thrust load produced by an intermeshing torque transmission component supported by a shaft within a housing of the work vehicle; outputting a strain value indicative of the localized strain, receiving the strain value at a control unit, deriving a torque value associated with the intermeshing torque transmission component based on the received strain value, and outputting the derived torque value for utilization in a work vehicle operation. Other embodiments of this aspect include corresponding computer systems, apparatus, and computer programs recorded on one or more computer storage devices, each configured to perform the actions of the methods.

Implementations may include one or more of the following features. The method may include utilizing the derived torque value to execute vehicle management strategies including: modifying a gear shift strategy based on the derived torque; implementing a power management protocol; and predicting the life of a vehicle component. The method may include: adjusting the derived torque value based on a calibration curve related to temperature variations measured by a temperature sensor; and outputting the adjusted torque value for adjusting a work vehicle operating parameter. The localized strain may include a summation of strain force components produced by both the axial thrust load and additional axial thrust loads transmitted by additional shafts and intermeshing torque transmission components. The method May include: comparing the derived torque value with a predetermined torque threshold; and generating an alert if the derived torque value exceeds the predetermined torque threshold. Implementations of the described techniques may include hardware, a method or process, or computer software on a computer-accessible medium.

One general aspect includes a torque determining system for a driveline of a work vehicle a driveline component including: a housing; a plurality of torque transmission components contained within the housing; a plurality of shafts supporting the torque transmission components for rotation about respective shaft axes, each shaft being coupled to the housing for relative rotation and configured to transfer axial thrust loads to the housing, where each axial thrust load is exerted at a distinct location on the housing that corresponds to a positional alignment of a respective shaft and torque transmission component, and each axial thrust load produces a strain force on the housing; a strain sensor mounted to the housing and configured to sense a strain produced by the plurality of shafts and torque transmission components on the housing, where the strain is a summation of strain force components caused by the axial thrust loads exerted at the distinct locations. Other embodiments of this aspect include corresponding computer systems, apparatus, and computer programs recorded on one or more computer storage devices, each configured to perform the actions of the methods.

Implementations may include one or more of the following features. The system where the control unit is further configured to monitor the strain value over time and detect patterns indicative of wear or potential failure of the torque transmission components, enabling predictive maintenance scheduling. The strain sensor is a fiber optic strain sensor that utilizes bragg grating technology to detect the localized strain arising from the axial thrust loads and provide high-resolution strain measurements to the control unit value; and a control unit having processing and memory architecture configured to: receive the strain value from the strain sensor; derive a torque value associated with the plurality of torque transmission components based on the strain value; and output the derived torque value for use in the work vehicle. Implementations of the described techniques may include hardware, a method or process, or computer software on a computer-accessible medium.

The details of one or more embodiments are set forth in the accompanying drawings and the description below. Other features and advantages will become apparent from the description, the drawings, and the claims.

BRIEF DESCRIPTION OF THE DRAWINGS

At least one example of the present disclosure will hereinafter be described in conjunction with the following figures.

Figure 1:
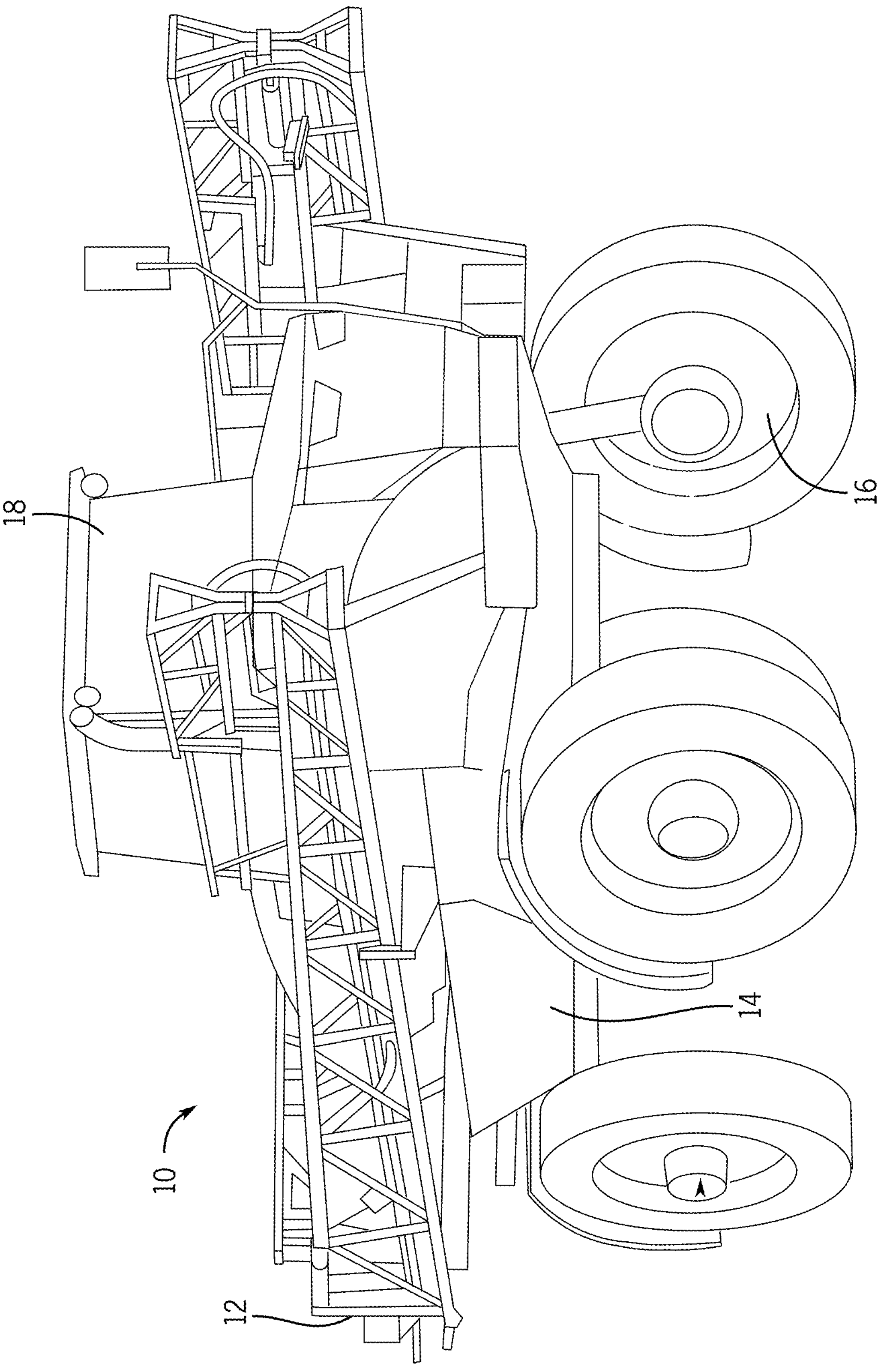
FIG. 1 is a perspective view of an example work vehicle that can be used to implement embodiments of the present disclosure.

Like reference symbols in the various drawings indicate like elements. For simplicity and clarity of illustration, descriptions, and details of well-known features and techniques may be omitted to avoid unnecessarily obscuring the example and non-limiting embodiments of the invention described in the subsequent Detailed Description. It should further be understood that features or elements appearing in the accompanying figures are not necessarily drawn to scale unless otherwise stated.

DETAILED DESCRIPTION

Embodiments of the present disclosure are shown in the accompanying FIGS. of the drawings described briefly above. Various modifications to the example embodiments may be contemplated by one of skill in the art without departing from the scope of the present invention, as set forth in the appended claims.

Overview

The present disclosure pertains to solutions that address the challenges associated with measuring and managing torque in the driveline components of work vehicles. Accurate torque measurement can be used to optimize vehicle performance, enhance maintenance strategies, and improve overall system reliability. Traditional methods of measuring torque using direct torque sensors are often costly and can require extensive modifications to the vehicle's transmission system. This disclosure introduces a torque determining system that utilizes strain sensors mounted on the transmission housing to infer torque values based on axial thrust loads.

The disclosed system features strain sensors that measure the strain exerted on a housing of a driveline component by the axial thrust load(s) produced by internal torque transmission components, such as helical gears. These sensors provide a cost-effective and less invasive alternative to direct torque sensors, and enable retrofitting of existing transmission systems without significant design changes. The strain sensors capture the axial loads and their output can be used to infer the torque values, thus eliminating the need for direct access to internal components.

The placement and calibration of the strain sensors are disclosed to achieve optimal sensitivity and accuracy. The location of the sensors on the housing can be determined through empirical testing and calibration to ensure the best resolution and correlation with actual torque values. An example torque determining system also incorporates temperature compensation mechanisms to account for environmental variations that can affect sensor performance, ensuring accurate torque measurements under different operating conditions.

The disclosed torque determining system is designed to be integrated into production environments, providing a practical solution for real-time torque monitoring. This torque determining system enhances vehicle performance, facilitates predictive maintenance, and reduces downtime by offering reliable and accurate torque measurements. By addressing the limitations of traditional torque measurement methods, the torque determining system provides a significant advancement in driveline technology for work vehicles.

The following description provides a detailed explanation of the embodiments and should be understood as a non-limiting example context for better understanding the present disclosure.

Example Torque Determining System for Driveline Components in Work Vehicles

Referring to FIG. 1, an example work vehicle 10 in the form of a self-propelled vehicle (e.g., an agricultural sprayer) houses or otherwise supports a sprayer system 12. The work vehicle 10 may be either a manned or autonomous vehicle. As is known, the sprayer system 12 may be primarily implemented to distribute and/or disperse a primary fluid (e.g., fertilizer, insecticide, water, or other fluid) across a geographical area (e.g., a field). The sprayer system 12 may include a fluid source and a pump coupled to a plurality of spray nozzles via an arrangement of plumbing lines, which generally corresponds to the system or array of lines, conduits, valves, tanks, and the like that facilitate the flow of primary fluid (and other fluids) within the sprayer system 12. Generally, the work vehicle 10 may include a vehicle frame or chassis 14 that is supported off the ground by ground engaging members 16 (e.g., wheels or tracks) and which supports a cab 18.

Figure 2:
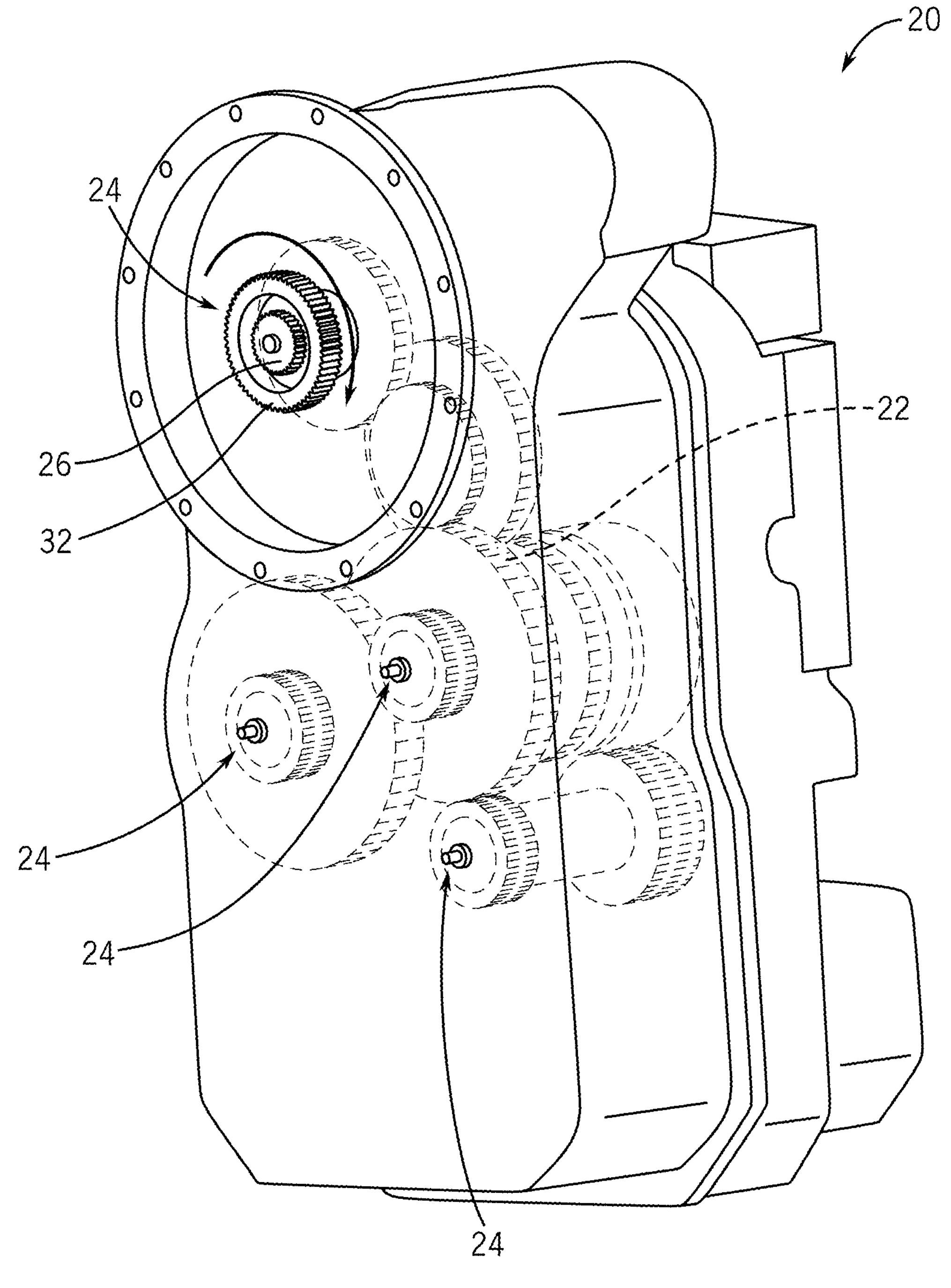
FIG. 2 is a perspective view of an example driveline component in the form of a transmission.
Figure 3:
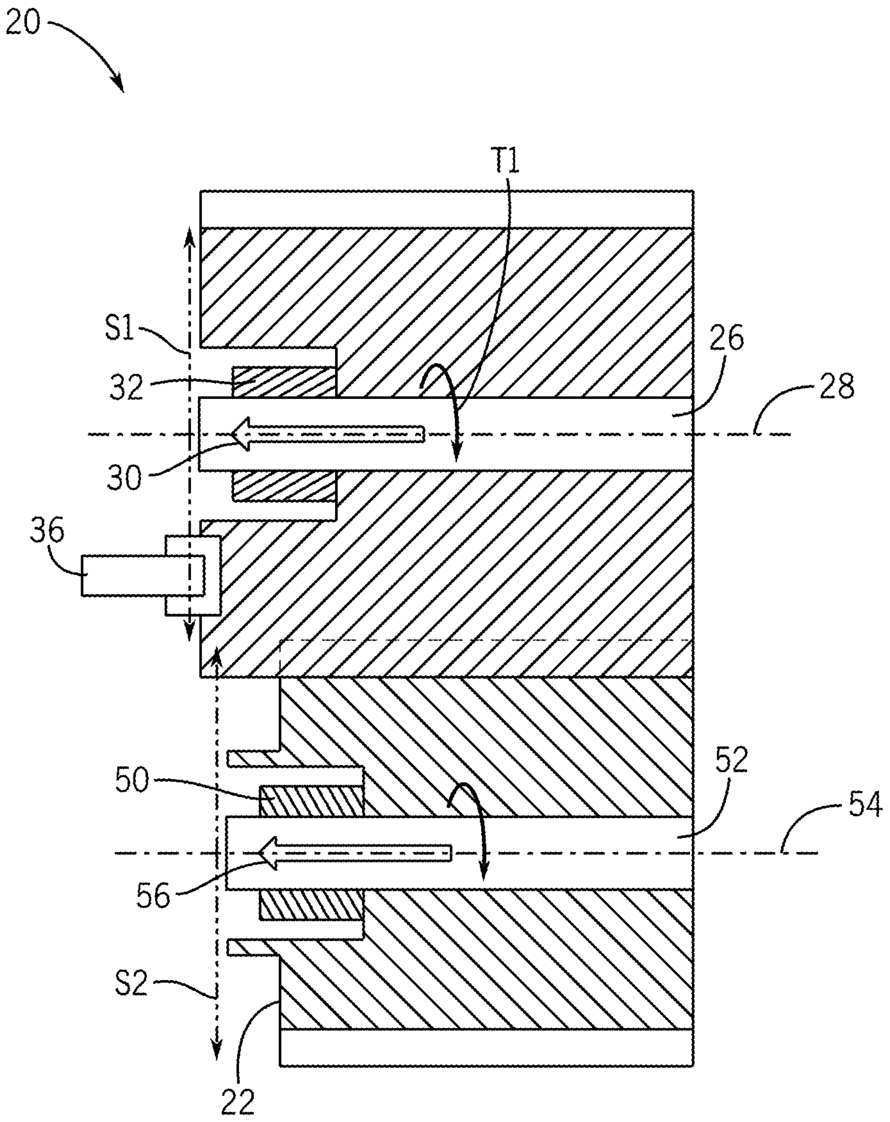
FIG. 3 is a schematic sectional view of an example driveline component.

Referring now to FIGS. 2 and 3 collectively, which illustrate a driveline component 20 of the work vehicle of FIG. 1. The driveline component 20 in this example is a transmission, although the torque determining systems disclosed herein are not limited to inclusion in transmissions.

The driveline component 20 generally includes a housing 22, an intermeshing torque transmission component 24 contained within the housing 22, and a shaft 26 supporting the intermeshing torque transmission component 24 for rotation about a shaft axis 28. For example, the shaft 26 applies a torque force T1 relative to the shaft axis 28.

The shaft 26 is coupled to the housing 22 for relative rotation and configured to transfer an axial thrust load 30 extending in a direction of the shaft axis 28 from the intermeshing torque transmission component 24 to the housing 22.

In some embodiments, the intermeshing torque transmission component 24 comprises a gear set 32 that includes at least one helical gear configured to generate the axial thrust load 30 when the torque force T1 is applied. Helical gears are known for their efficiency and smooth operation, making them useful in work vehicle driveline systems. The angled teeth of helical gears engage gradually and produce an axial thrust load 30 along the shaft axis 28. This axial thrust load is transferred to the housing 22, as a strain force component S1 that is detected by a strain sensor 36.

The helical gear's design generates axial forces due to the helix angle of the gear teeth. For example, in a typical gear set with helical gears, as the torque force T1 is applied to the gear set by the shaft 26, the teeth of the helical gears engage progressively. This engagement creates a force that is not only perpendicular to the gear face but also parallel to the gear axis, resulting in the axial thrust load 30. This load is then transferred through the shaft 26 to the housing 22, causing the strain force component S1 that is measured by the strain sensor 36.

Consider a practical application in a heavy-duty work vehicle such as a tractor. The tractor's transmission might include multiple helical gears in its gear set to handle various loads and speeds. When the tractor is operating under heavy load conditions, the torque applied to the helical gears increases, leading to higher axial thrust loads. Strain sensor 36, mounted on the housing 22, detects the resulting strain from these axial thrust loads and sends the strain value to a control unit. A control unit, discussed below, processes these values to derive an accurate torque measurement, which is used to optimize the tractor's performance, ensuring efficient power delivery, and preventing mechanical failures.

The strain sensor 36 can be mounted to the housing 22, and output strain values to a control unit 38. In general, the strain sensor 36 can sense a localized strain S1 arising in the housing 22. The control unit 38 can utilize the localized strain S1 to determine a torque value occurring in the housing 22 due to the torque-producing components located in the housing 22, such as the intermeshing torque transmission component 24.

Figure 4:
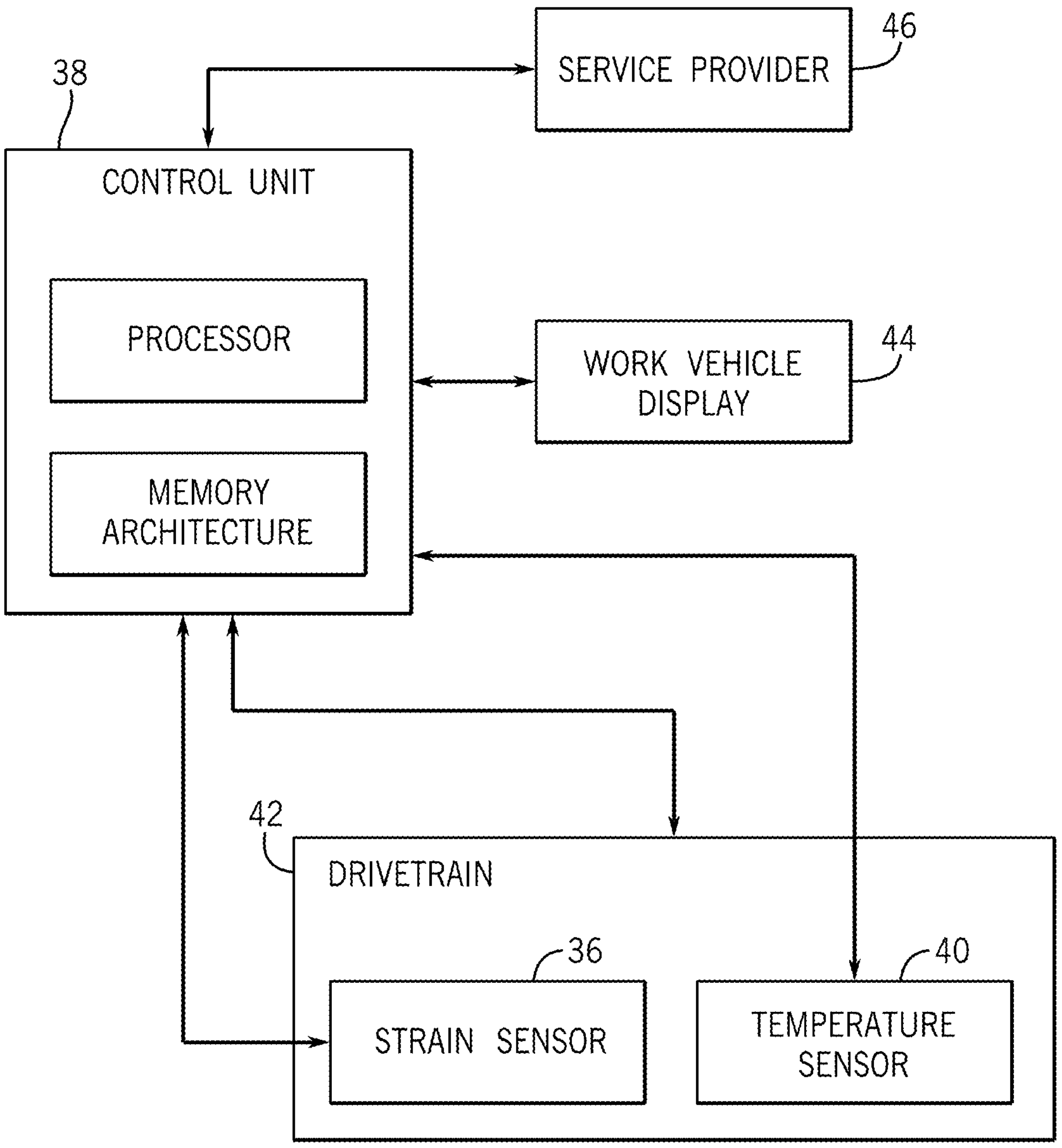
FIG. 4 is a schematic diagram of an example torque determining system according to the present disclosure.

FIG. 4 is a schematic diagram of a torque determining system of the present disclosure. In one implementation, the torque determining system includes the strain sensor 36, the control unit 38, and a temperature sensor 40.

Strain sensor 36 is designed to measure torque by detecting localized strain resulting from axial thrust loads in a driveline component of a work vehicle. One example of strain sensor 36 is a piezoelectric type, which generates an electrical signal proportional to the strain experienced at the sensor's mounting location. Piezoelectric strain sensors are known for high sensitivity and ability to provide precise measurements in dynamic conditions, making them suitable for real-time torque monitoring in work vehicles.

Another type of strain sensor 36 is a fiber optic strain sensor, which utilizes Bragg grating technology to detect strain. This type of sensor offers high resolution and accuracy, as well as immunity to electromagnetic interference, which can be particularly beneficial in the electrically noisy environments of vehicle transmissions. Fiber optic strain sensors are also capable of operating over a wide temperature range, ensuring reliable performance under varying environmental conditions.

The extensometer strain sensor is another embodiment that uses two strain gauges for temperature compensation. This design minimizes the impact of temperature fluctuations on strain measurements, ensuring consistent accuracy. Extensometers are easy to install and remove, making them a cost-effective option for retrofitting existing transmission systems without extensive modifications.

Temperature compensation mechanisms are also used in combination with the strain sensor 36. Variations in temperature can significantly affect strain measurements, thus sensors are equipped with features to mitigate these effects. For instance, the extensometer strain sensor includes built-in temperature compensation to maintain accuracy under different operating conditions.

In sum, the strain sensor platforms disclosed can encompasses a range of technologies, including piezoelectric, fiber optic, and extensometer types, each offering unique benefits for torque measurement in work vehicles. The integration of these sensors into the housing 22, along with careful placement and temperature compensation, ensures reliable and accurate torque monitoring based on measured strain values.

As noted above, some strain sensors include temperature sensors. However, there can also be a separate temperature sensor 40 used in conjunction with strain sensor 36. This approach involves placing the temperature sensor 40 in proximity to the strain sensor 36 on the housing 22. The temperature sensor 40 continuously (or periodically) monitors a local temperature, and the data is used by the control unit 38 to adjust the derived torque values based on a calibration curve related to temperature variations. One method enhances the precision of torque measurements by separately accounting for the thermal effects on the strain readings.

The strain-based torque measurements disclosed above can be used in various related operations relative to the work vehicle. In some embodiments, the control unit 38 is configured to compare the derived torque value with a predetermined torque threshold and generate an alert when the derived torque value exceeds the predetermined torque threshold. This feature provides proactive maintenance and safety management of work vehicles. By setting specific torque thresholds, the torque determining system can identify when the torque levels are reaching critical limits that might indicate potential mechanical issues or imminent component failure.

For instance, in a heavy-duty mining truck, the driveline components, including gears and shafts, are subjected to extreme stress and high torque loads during operation. The control unit 38 continuously monitors the torque values derived from the strain sensor 36. Suppose the torque threshold is set at 10,000 Nm, which represents the maximum safe operating limit for the truck's transmission system. If the derived torque value exceeds this threshold, the control unit 38 immediately generates an alert. This alert can notify the operator through the vehicle's dashboard display or trigger an automated response, such as reducing engine power or adjusting gear shifts to mitigate further stress on the driveline.

Similarly, in an agricultural harvester, which operates under varying load conditions, the ability to monitor and respond to torque levels is essential. Assume the torque threshold for the harvester is set at 7,500 Nm. As the harvester encounters different types of crops and soil conditions, the torque on the driveline can fluctuate significantly. The control unit 38, equipped with logic to handle these variations, compares the real-time torque data against the predetermined threshold. If an excessive torque value, such as 8,200 Nm, is detected, indicating possible overloading or mechanical strain, the system generates an alert. This alert can prompt the operator to slow down or adjust the harvesting speed, preventing damage to the transmission components and ensuring continuous, efficient operation.

The capability of the control unit 38 to generate alerts based on torque thresholds enhances the overall reliability and safety of work vehicles. It enables operators to manage their equipment more effectively, reducing the risk of unexpected breakdowns and extending the lifespan of driveline components. Additionally, this feature supports the implementation of predictive maintenance schedules, where alerts can trigger inspections and maintenance activities before significant issues arise, ensuring optimal performance and reducing downtime. Overall, the integration of torque threshold comparison and alert generation in the control unit 38 provides an enhancement for modern work vehicles, providing real-time monitoring and immediate response capabilities to maintain operational efficiency and safety. These torque deriving systems not only safeguard the mechanical integrity of the vehicles but also optimize the operational lifespan and performance of the work vehicle 10.

In embodiments where the driveline component 20 includes multiple intermeshing torque transmission components, such as an intermeshing torque transmission component 50 and additional shafts, such as shaft 52. Each additional 21 shaft is configured to transfer an additional axial thrust load 56 to the housing 22 along respective shaft axis 54 and create an additional strain force component S2.

In some embodiments the additional shaft 52 and additional intermeshing torque transmission component 50 intersect the housing 22 at distinct locations along the housing as shown in FIG. 3, where the torque transmission component 24 is located at a distance from the intermeshing torque transmission component 50.

The placement of the strain sensor 36 ensures that the strain sensor 36 can accurately detect the localized strain generated by these additional components. That is, the strain sensor 36 can capture a summation of the strain force components, which include individual strain force components S1 and S2 generated by each axial thrust load 30 and 56.

By measuring a single localized strain value that is representative of these distinct strains, the control unit 38 can process the data to derive a comprehensive torque value that reflects the cumulative impact of all the intermeshing torque transmission components 24 and 50 and their respective shafts 26 and 52 on the driveline component 20. This approach enhances the accuracy of the torque measurements and ensures the reliable performance of the work vehicle's driveline system. Stated succinctly, the strain sensor 36 mounted on the housing 22 detects a localized strain resulting from the summation of strain force components caused by both the axial thrust load 30 and the additional axial thrust load 56.

As noted above, to improve the accuracy of the derived torque value, the system may include a temperature sensor 40 to monitor the local temperature of the housing 22. The temperature sensor 40 provides temperature data to the control unit 38, which adjusts the strain values from the strain sensor 36 based on the detected temperature. This adjustment compensates for any temperature-induced variations in the strain measurements, ensuring consistent accuracy across different operational conditions.

In some embodiments, the control unit 38 is configured to enhance the operational safety and maintenance efficiency of work vehicles by implementing a monitoring system that can compare the derived torque value with a predetermined torque threshold and generate an alert when the derived torque value exceeds the predetermined torque threshold. This feature is useful for identifying potential issues before they escalate into significant problems, ensuring that the vehicle operates within safe and optimal parameters.

Consider an example that applies to construction equipment like excavators, an example work vehicle. These machines rely on precise torque management for tasks such as lifting and digging. The control unit 38 in the torque determining system of an excavator might have a threshold set at 12,000 Nm. During operation, if the derived torque value surpasses this threshold, reaching 12,500 Nm, for example, the control unit 38 generates an alert that can be presented on a work vehicle display 42. This immediate feedback allows the operator to take corrective measures, such as redistributing the load or halting operations temporarily, to ensure that the equipment remains within safe operating limits and to prevent undue stress on the driveline components.

In some embodiments, the control unit 38 utilizes the derived torque value to implement a power management protocol for the work vehicle. This approach ensures that the vehicle operates at optimal efficiency by adjusting power distribution based on real-time torque data. For example, in a heavy-duty tractor performing various agricultural tasks, the control unit 38 continuously monitors the torque values derived from the strain sensor 36. If the derived torque value indicates that the tractor is operating under a high load, the control unit 38 can adjust the power output to the drivetrain 44, ensuring that the engine delivers sufficient power without overloading the system. Conversely, when the torque values indicate a lower load, the control unit 38 can reduce the power output, thereby conserving fuel and reducing wear on the engine and driveline components. This dynamic power management not only improves the tractor's performance and efficiency but also extends the operational life of its components.

In other embodiments, the control unit 38 uses the derived torque value to predict the life of a work vehicle component and schedule maintenance or replacement based on predicted wear and tear inferred from the derived torque. For instance, in a construction excavator, the control unit 38 analyzes the torque data over time to identify patterns that suggest gradual degradation of components such as gears, shafts, or bearings. By establishing a correlation between the torque values and the expected lifespan of these components, the control unit 38 can forecast when a component is likely to need replacement. If the torque values indicate that a particular component is experiencing higher than normal stress, the control unit 38 can schedule maintenance or replacement before a failure occurs. This predictive maintenance approach minimizes downtime and avoids unexpected breakdowns, ensuring that the excavator remains operational and efficient. By leveraging real-time torque data, the control unit helps optimize maintenance schedules, reduce repair costs, and enhance the overall reliability of the work vehicle. In some examples, the control unit 38 can transmit data over a network to a service provider 46. The data can include a message pertaining to scheduled maintenance or replacement of parts of the work vehicle 10.

Figure 5:
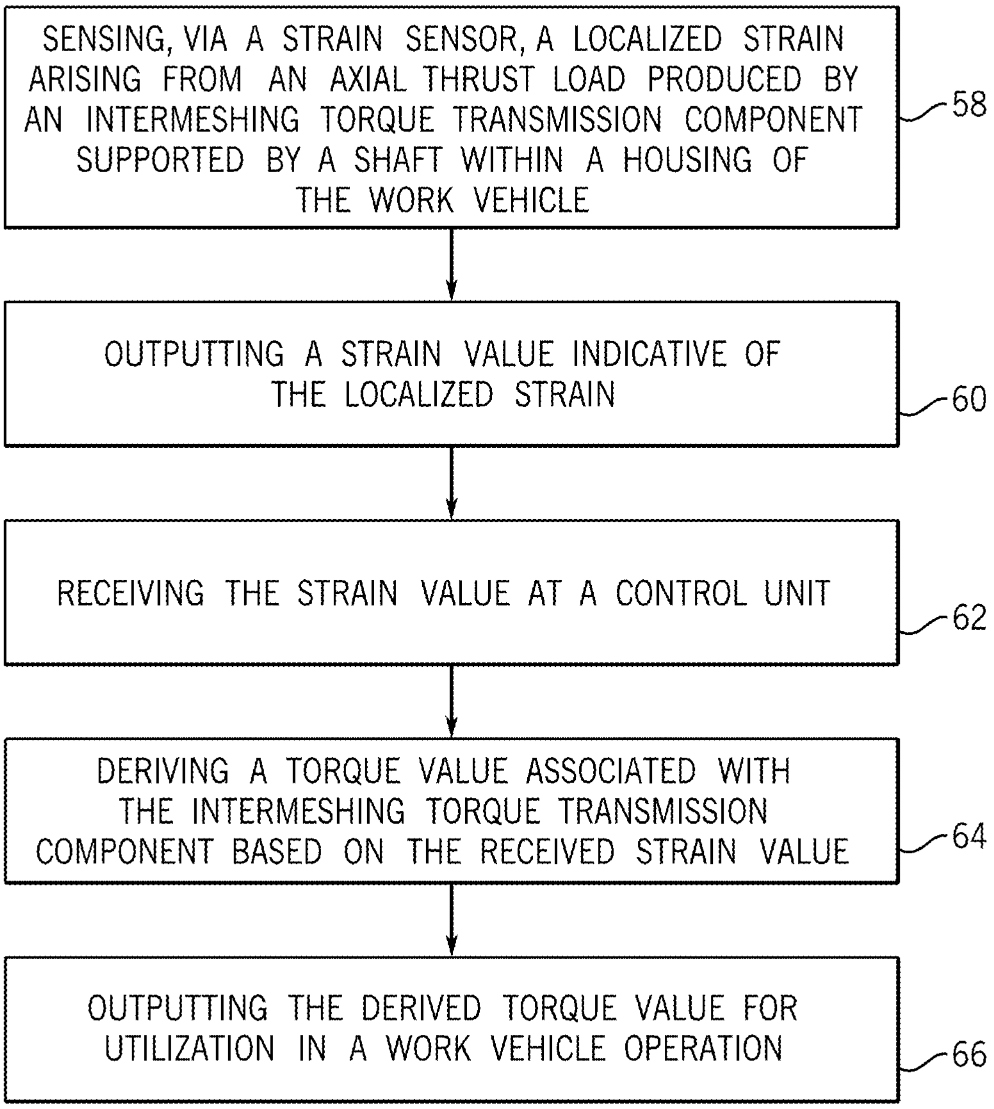
FIG. 5 is a flowchart of an example method for implementing the torque determining system according to the present disclosure.

FIG. 5 is a flowchart of an example method that can be executed by a control unit of the present disclosure. The method can include a step of 58 sensing, via a strain sensor, a localized strain arising from an axial thrust load produced by an intermeshing torque transmission component supported by a shaft within a housing of the work vehicle. As the intermeshing torque transmission component, such as a helical gear, operates, it generates an axial thrust load along the shaft. This load causes localized strain in the housing. The strain sensor detects this strain, capturing the mechanical deformation in the sidewall of the housing caused by the axial thrust load.

The method also includes a step 60 of outputting a strain value indicative of the localized strain. Once the strain sensor detects the localized strain, the strain sensor converts this mechanical deformation into an electrical signal. This signal, which is indicative of the magnitude of the strain, is then outputted as a strain value. This strain value represents the amount of deformation experienced by the housing due to the axial thrust load, providing a quantifiable measure of the strain for further processing.

In some instances, the method includes a step 62 of receiving the strain value at a control unit. The strain value outputted by the strain sensor is transmitted to the control unit. The control unit is equipped with a processor and memory architecture capable of handling and analyzing incoming data. Upon receiving the strain value, the control unit stores this data for further computation and analysis. This step ensures that the strain information is captured and made available for subsequent processing.

The method may also include a step 64 of deriving a torque value associated with the intermeshing torque transmission component based on the received strain value. With the strain value received and stored, the control unit employs algorithms to derive a torque value. These algorithms use the relationship between the measured strain and the torque generated by the intermeshing torque transmission component. By analyzing the strain data, the control unit calculates the corresponding torque value. This derived torque value accurately reflects the amount of torque being transmitted through the intermeshing component.

In some implementations, the method can include a step of outputting the derived torque value for utilization in a work vehicle operation. That is, the control unit outputs the derived torque value, making the derived torque value available for use in the work vehicle's operational systems. This torque value can be utilized for various purposes, such as adjusting power management protocols, informing gear shift strategies, or triggering maintenance alerts.

Determination of Strain Sensor Placement on Housing

Referring back to FIGS. 2-4, the placement of the strain sensor 36 on the housing 22 is a critical factor in ensuring accurate and reliable torque measurements. Given the unique configuration of each type of driveline component, the location and placement of the strain sensor are determined through an empirical process during manufacturing.

Determining the optimal location for the strain sensor involves a thorough understanding of the mechanical stresses and strains experienced by the housing during operation. The goal is to position the strain sensor at a point where the strain induced by the axial thrust loads from the intermeshing torque transmission components is most pronounced and can be measured with the highest sensitivity and accuracy.

To determine the best placement for the strain sensor 36, a finite element analysis (FEA) of the housing 22 can be performed. FEA is a computational tool used to simulate and analyze the physical behavior of structures under various load conditions. By applying the expected axial thrust loads and torque forces in the simulation, engineers can visualize the distribution of stresses and strains throughout the housing. The results of this analysis reveal the areas of the housing that experience the highest levels of localized strain.

Once the high-strain regions are identified through FEA, empirical testing is performed to validate the simulation results. This testing involves applying known loads to the driveline component and using temporary strain sensors to measure the actual strains in various locations on the housing. By comparing the measured strain values with the predicted values from the FEA, the accuracy of the simulation and refine the placement strategy for the strain sensor 36 can be confirmed.

For instance, in a work vehicle transmission system, the housing 22 may have multiple potential locations for mounting the strain sensor 36. The FEA might indicate that certain areas near the mounting points of the shafts 26, where the axial thrust loads are transferred, exhibit higher strain concentrations. These areas are then subjected to further empirical testing to ensure that the strain readings are consistent and provide a clear correlation with the applied torque.

Additionally, the placement of the strain sensor 36 must account for practical considerations such as accessibility, ease of installation, and protection from environmental factors. The chosen location allows for secure attachment of the strain sensor and minimizes exposure to potential damage from debris, temperature extremes, or other harsh operating conditions.

By combining advanced simulation techniques with empirical testing, the optimal placement for the strain sensor 36 on the housing 22 can be determined. This precise placement ensures that the sensor accurately captures the localized strain resulting from axial thrust loads, providing reliable data for the control unit 38 to derive torque values.

CONCLUSION

This disclosure has outlined a torque determining system for driveline components in work vehicles, utilizing strain sensors to measure torque based on axial thrust loads. The presented torque determining system offers a cost-effective and less invasive alternative to traditional torque sensors, addressing significant challenges in torque measurement and vehicle maintenance. By positioning a strain sensor on a housing, the torque determining system captures the axial loads produced by torque transmission components, enabling accurate and reliable torque measurements without requiring direct access to internal components.

The integration of strain sensors ensures optimal sensitivity and accuracy, with careful calibration and placement determined through empirical testing. Additionally, the torque determining system incorporates temperature compensation mechanisms to maintain performance under varying environmental conditions, further enhancing the reliability of the torque measurements. These features collectively contribute to a more efficient and robust torque measurement system, facilitating real-time monitoring and predictive maintenance. The disclosed torque determining system not only improves vehicle performance and reduces downtime but also supports the longevity and continuous operation of work vehicles in demanding environments.

As utilized herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C). Also, the use of "one or more of" or "at least one of" in the claims for certain elements does not imply other elements are singular nor has any other effect on the other claim elements.

As utilized herein, the singular forms "a", "an," and "the" are intentionally-grown to include the plural forms as well, unless the context clearly indicates otherwise. It will be further understood that the terms "comprises" and/or "comprising," when utilized in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intentionally-grown to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A torque determining system for a driveline of a work vehicle, the system comprising:

a driveline component having:

a housing;

an intermeshing torque transmission component contained within the housing; and a shaft supporting the intermeshing torque transmission component for rotation about a shaft axis, the shaft being coupled to the housing for relative rotation and configured to transfer an axial thrust load extending in a direction of the shaft axis from the intermeshing torque transmission component to the housing;

a strain sensor mounted to the housing and configured to:

sense a localized strain arising in the housing from the axial thrust load; and output a strain value that is indicative of the localized strain; and a control unit having processing and memory architecture configured to execute logic to:

receive the strain value from the strain sensor;

derive a torque value associated with the intermeshing torque transmission component based on the received strain value; and output the derived torque value for utilization on the work vehicle.

2. The system according to claim 1, wherein the driveline component includes additional intermeshing torque transmission components and additional shafts that each transfer additional axial thrust loads to the housing along additional shaft axes, wherein the localized strain is caused by the axial thrust load and the additional axial thrust loads.

3. The system according to claim 2, wherein the axial thrust load and the additional axial thrust loads, each produce a strain force component and the localized strain is a summation of strain force components.

4. The system according to claim 3, wherein the additional shafts and additional intermeshing torque transmission components intersect the housing at a distinct location along the housing.

5. The system according to claim 1, wherein the strain sensor is located at a position on the housing that corresponds to a point of maximum strain measured which was predetermined for the driveline component and housing.

6. The system according to claim 1, wherein the intermeshing torque transmission component comprises a gear set, and the gear set includes at least one helical gear configured to generate the axial thrust load when torque is applied.

7. The system according to claim 1, wherein the control unit is further configured to compare the derived torque value with a predetermined torque threshold and generate an alert when the derived torque value exceeds the predetermined torque threshold.

8. The system according to claim 1, wherein the strain sensor is a piezoelectric type sensor designed to output electrical signals proportional to the localized strain experienced at a mounting location of the strain sensor.

9. The system according to claim 1, wherein the control unit is configured to:

adjust the derived torque value based on a calibration curve related to temperature variations measured by a temperature sensor; and output an adjusted torque value for adjusting a work vehicle operating parameter.

10. The system according to claim 1, wherein the control unit utilizes the derived torque value to modify a gear shift strategy for the work vehicle.

11. The system according to claim 1, wherein the control unit utilizes the derived torque value to implement a power management protocol for the work vehicle.

12. The system according to claim 1, wherein the control unit utilizes the derived torque value to predict a life of a work vehicle component or schedule maintenance or replacement of the work vehicle component based on predicted wear and tear inferred from the derived torque.

13. A method for determining torque in a work vehicle, the method comprising:

sensing, via a strain sensor, a localized strain arising from an axial thrust load produced by an intermeshing torque transmission component supported by a shaft within a housing of the work vehicle;

outputting a strain value indicative of the localized strain;

receiving the strain value at a control unit;

deriving a torque value associated with the intermeshing torque transmission component based on the received strain value; and outputting the derived torque value for utilization in a work vehicle operation.

14. The method according to claim 13, further comprising utilizing the derived torque value to execute vehicle management strategies including:

modifying a gear shift strategy based on the derived torque;

implementing a power management protocol; and predicting a life of a vehicle component.

15. The method according to claim 13, further comprising:

adjusting the derived torque value based on a calibration curve related to temperature variations measured by a temperature sensor; and outputting the adjusted torque value for adjusting a work vehicle operating parameter.

16. The method according to claim 13, wherein the localized strain comprises a summation of strain force components produced by both the axial thrust load and additional axial thrust loads transmitted by additional shafts and intermeshing torque transmission components.

17. The method according to claim 13, further comprising:

comparing the derived torque value with a predetermined torque threshold; and generating an alert if the derived torque value exceeds the predetermined torque threshold.

18. A torque determining system for a driveline of a work vehicle, comprising:

a driveline component including:

a housing;

a plurality of torque transmission components contained within the housing;

a plurality of shafts supporting the torque transmission components for rotation about respective shaft axes, each shaft being coupled to the housing for relative rotation and configured to transfer axial thrust loads to the housing, wherein each axial thrust load is exerted at a distinct location on the housing that corresponds to a positional alignment of a respective shaft and torque transmission component, and each axial thrust load produces a strain force on the housing;

a strain sensor mounted to the housing and configured to sense a strain produced by the plurality of shafts and torque transmission components on the housing, wherein the strain is a summation of strain force components caused by the axial thrust loads exerted at the distinct locations, the strain sensor outputting a strain value; and a control unit having processing and memory architecture configured to:

receive the strain value from the strain sensor;

derive a torque value associated with the plurality of torque transmission components based on the strain value; and output the derived torque value for use in the work vehicle.

19. The system according to claim 18, wherein the control unit is further configured to monitor the strain value over time and detect patterns indicative of wear or potential failure of the torque transmission components.

20. The system according to claim 18, wherein the strain force comprises a summation of strain force components produced by both the axial thrust load and additional axial thrust loads transmitted by additional shafts and intermeshing torque transmission components.

* * * * *